United States Patent
Brown

(10) Patent No.: US 7,899,673 B2
(45) Date of Patent: Mar. 1, 2011

(54) AUTOMATIC PRUNING OF GRAMMARS IN A MULTI-APPLICATION SPEECH RECOGNITION INTERFACE

(75) Inventor: Christopher Ralph Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1239 days.

(21) Appl. No.: 11/501,535

(22) Filed: Aug. 9, 2006

(65) Prior Publication Data

US 2008/0059195 A1    Mar. 6, 2008

(51) Int. Cl.
G10L 21/00 (2006.01)
G10L 15/00 (2006.01)
G10L 15/04 (2006.01)
G10L 15/18 (2006.01)
G06F 17/27 (2006.01)
G06F 17/21 (2006.01)

(52) U.S. Cl. ............................. 704/270; 704/9; 704/10; 704/231; 704/251; 704/270.1; 704/257; 704/275

(58) Field of Classification Search .................. 704/270, 704/270.1, 275, 231, 251, 257
See application file for complete search history.

(56) References Cited

U.S. PATENT DOCUMENTS

| | | | |
|---|---|---|---|
| 6,125,347 A * | 9/2000 | Cote et al. | 704/275 |
| 6,233,559 B1 * | 5/2001 | Balakrishnan | 704/275 |
| 6,654,720 B1 * | 11/2003 | Graham et al. | 704/270 |
| 6,839,670 B1 * | 1/2005 | Stammler et al. | 704/251 |
| 7,072,837 B2 * | 7/2006 | Kemble et al. | 704/257 |
| 7,149,792 B1 * | 12/2006 | Hansen et al. | 709/220 |
| 7,167,831 B2 * | 1/2007 | Falcon et al. | 704/275 |
| 7,177,807 B1 * | 2/2007 | Schmid et al. | 704/231 |
| 7,203,645 B2 * | 4/2007 | Pokhariyal et al. | 704/251 |
| 7,302,392 B1 * | 11/2007 | Thenthiruperai et al. | 704/251 |
| 7,480,619 B1 * | 1/2009 | Scott | 704/275 |
| 7,505,910 B2 * | 3/2009 | Kujirai | 704/275 |
| 7,516,077 B2 * | 4/2009 | Yokoi et al. | 704/275 |
| 7,529,668 B2 * | 5/2009 | Abrego et al. | 704/244 |
| 2003/0171929 A1 * | 9/2003 | Falcon et al. | 704/275 |

* cited by examiner

Primary Examiner—James S Wozniak
Assistant Examiner—Paras Shah
(74) Attorney, Agent, or Firm—Merchant & Gould P.C.

(57) ABSTRACT

Management of multiple voice-controlled applications is provided employing registration and prioritization of applications and associated commands. In a multi-application environment, each application requests registration by a speech recognition interface. Upon registering the application(s), the interface assigns priorities to the active applications. Each application also submits a list of associated commands for registration. The interface selects a subset of submitted commands to be registered and assigned priorities. Speech recognition is performed based on the selected and prioritized commands to reduce interface overload and grammar conflict.

19 Claims, 6 Drawing Sheets

AUTOMATIC PRUNING OF GRAMMARS IN A MULTI-APPLICATION SPEECH RECOGNITION INTERFACE

BACKGROUND

One of the forefronts of computing technology is speech recognition. With computerized applications controlling many aspects of daily activities from word processing to controlling appliances, providing speech recognition based interfaces for such applications is a high priority of research and development for many companies. Even web site operators and other content providers are deploying voice driven interfaces for allowing users to browse their content. The voice interfaces commonly include "grammars" that define valid utterances (words, terms, phrases, etc.) that can occur at a given state within an application's execution. The grammars are fed to a speech recognition system and used to interpret the user's voice entry.

Speech recognition systems have inherent challenges such as distinction of grammar over background noise, reliability of recognition for larger sizes of the grammar, and the like. Another challenge for speech recognition systems is multi-application environments. While operating systems are known, which provide a multi-tasking capability thereby allowing multiple application programs to run essentially simultaneously, coordinating control of multiple applications through a single speech recognition interface presents many hurdles. As the number of active applications along with their associated list of commands increases, and the combined grammar expands, the system may become less usable, because the application grammars may have an increasing tendency to compete with each other.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to managing a plurality of applications through a speech recognition interface. Applications may be registered as they are activated and assigned priority levels. Each registered application may then request registration of a set of commands associated with that application. A subset of commands among the set requested for registration by the application may be selected for use by the speech recognitions interface. The selected commands may then be assigned command priority levels. The speech recognition system may interpret voice input and provide recognized commands based on the application and command priority structure(s).

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, a speech recognition system in a multi-application environment may be enhanced by adding grammar pruning based on assignment of priorities at application and command levels. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
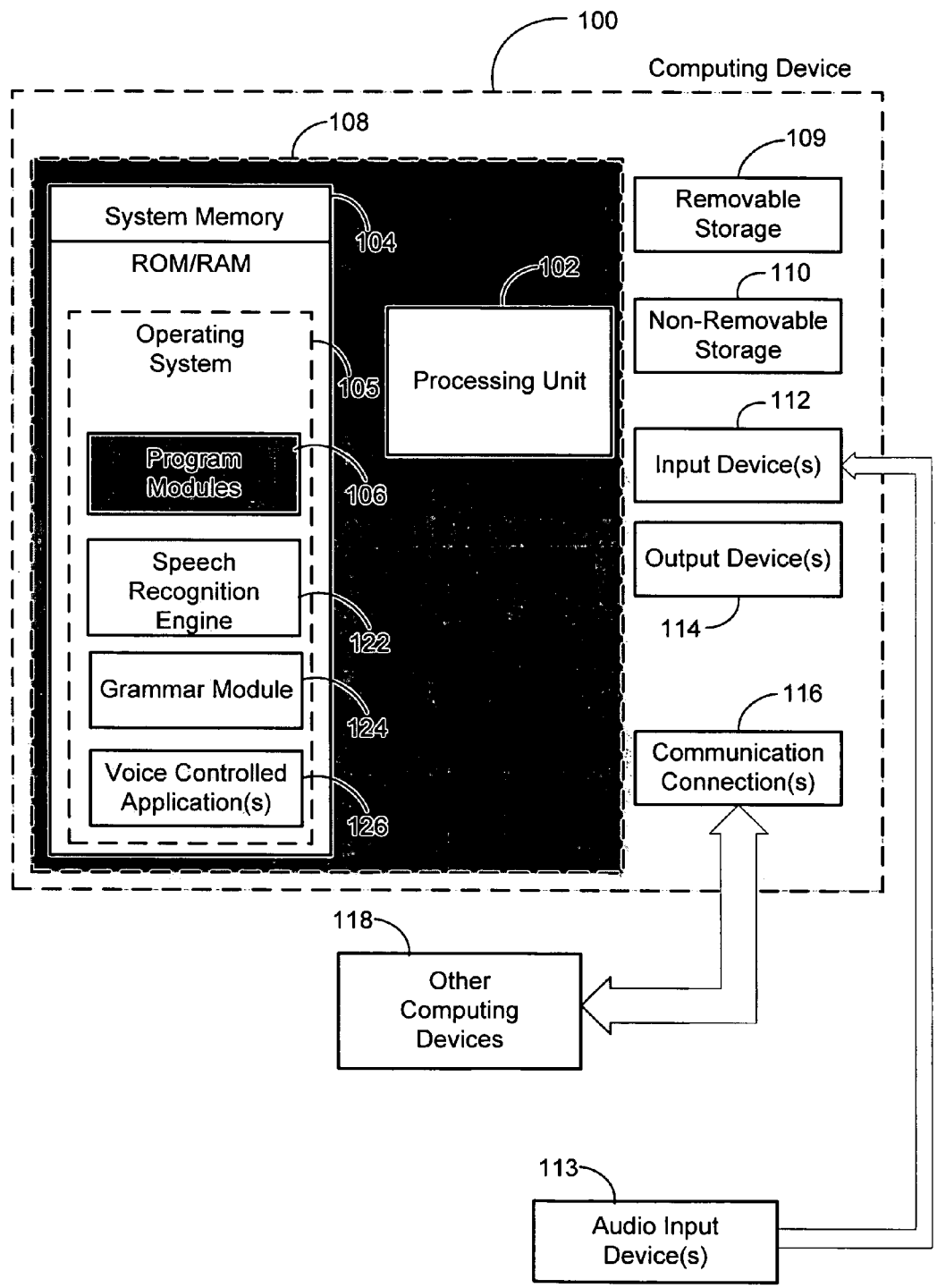
FIG. 1 is a block diagram of an example computing operating environment.

Referring now to the drawings, aspects and an exemplary operating environment will be described. FIG. 1 and the following discussion are intended to provide a brief, general description of a suitable computing environment in which the invention may be implemented. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one example system for implementing the embodiments includes a computing device, such as computing device 100. In a basic configuration, the computing device 100 typically includes at least one processing unit 102 and system memory 104. Computing device 100 may include a plurality of processing units that cooperate in executing programs. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications such as program modules 106, speech recognition engine 122, grammar module 124, and voice controlled application(s) 126.

Speech recognition engine 122 and grammar module 124 may work in a coordinated manner as part of a voice interface system in managing voice controlled application(s) 126. As described below in more detail, speech recognition engine 122 and grammar module 124 may reduce grammar contention, grammar overlap, and the like, by assigning and managing application- and command-level priorities. Voice controlled application(s) 126 may be any program that receives speech recognition based input such as a word processing program, a navigation program, a media player control program, a communication program, and the like. Speech recognition engine 122 and grammar module 124 may be an integrated part of voice controlled application 126 or separate applications. Speech recognition engine 122, grammar module 124, and voice controlled application(s) 126 may communicate between themselves and with other applications running on computing device 100 or on other devices. Furthermore, either one of speech recognition engine 122, grammar module 124, and voice controlled application(s) 126 may be executed in an operating system other than operating system 105. This basic configuration is illustrated in FIG. 1 by those components within dashed line 108.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Furthermore, input devices 112 may receive input from other input devices such as audio input devices 113 in some specific implementations. For example, a speech recognition system with grammar pruning may receive training data from microphones directly connected to the computing device 100 or from recording devices that provide pre-recorded audio data.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
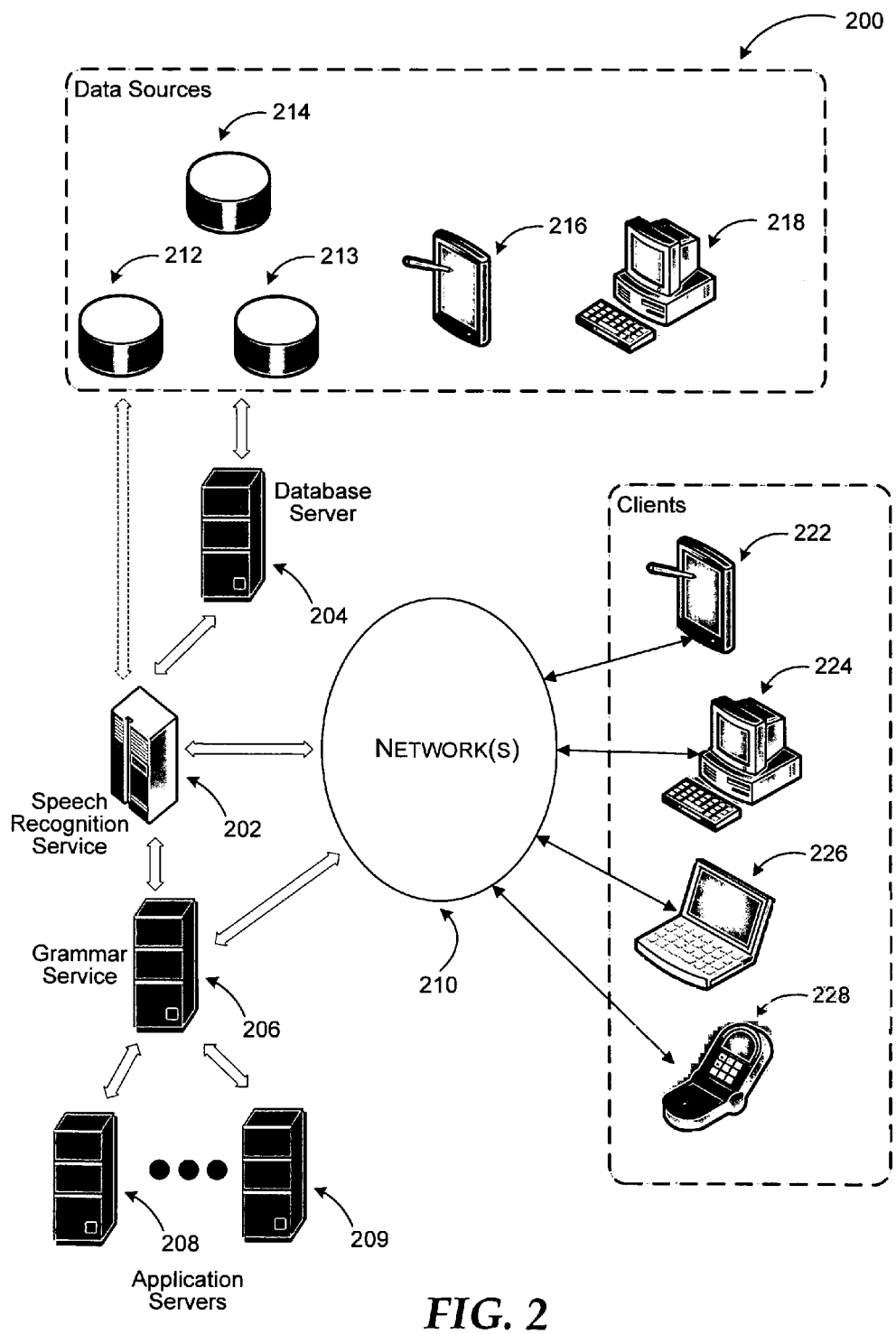
FIG. 2 illustrates a networked system where example embodiments may be implemented.

Referring to FIG. 2, a networked system where example embodiments may be implemented, is illustrated. System 200 may comprise any topology of servers, clients, Internet service providers, and communication media. Also, system 200 may have a static or dynamic topology. The term "client" may refer to a client application or a client device employed by a user to perform operations associated with an adaptation system. While the adaptation system may include many more components, relevant ones are discussed in conjunction with this figure.

Speech recognition service 202, database server 204, grammar service 206, and application servers 208 and 209 may also be one or more programs or a server machine executing programs associated with the adaptation system tasks. Similarly, data sources may include one or more data stores, input devices, and the like.

A speech recognition based system may be run on a server or a client machine connected to network(s) 210 and use speech recognition service 202 to convert audio (voice) input to textual commands. Speech recognition service 202 may use a generic language model and data for customizing the language model from data sources 212-214, 216, and 218 directly or through database server 204. The data sources may include data stores where generic language models and other customization data may be stored or user devices for providing direct input such as audio training data in speech recognition system. As such, data sources may also encompass client devices 222-228 for providing input to speech recognition service 202. Data sources may include SQL servers, databases, non multi-dimensional data sources, file compilations, data cubes, and the like. Database server 204 may manage the data sources.

Based on the language model data and grammar pruning feedback from the grammar service 206, speech recognition service 202 is configured to provide voice controlled applications on client devices 222, 224, 226, and 228 or application servers 208 and 209 textual commands in response to voice input by a user.

Grammar service 206 may provide a grammar pruning service for a speech recognition interface of the speech recognition service 202. In a multi-application environment, the speech recognition interface may get overloaded with a large number of commands for different applications, and possibly their synonyms. Furthermore, one or more applications may use the same word or phrase for different commands. Thus grammar conflict could be a problem in a multi-application environment. By registering applications and their associated commands, assigning priorities to the registered applications and commands, grammar service 206 may enable an efficient operation of the speech recognition interface in coordinating multiple applications.

Users may interact with speech recognition service 202 and/or application servers 208 and 209 from client devices 222, 224, 226, and 228 over network(s) 210. In some embodiments, users may run applications that consume the commands provided by speech recognition service 202 in the individual client devices (or applications). In other embodiments, such applications may be controlled by application servers 208 and 209 and interface with the users client devices 222, 224, 226, and 228 over network(s) 210.

Network(s) 210 may include a secure network such as an enterprise network, or an unsecure network such as a wireless open network. Network(s) 210 provide communication between the nodes described above. By way of example, and not limitation, network(s) 210 may include wired media such as a wired network or direct-wired connection, and wireless media such as acoustic, RF, infrared and other wireless media.

Many other configurations of computing devices, applications, data sources, data distribution and analysis systems may be employed to implement a speech recognition system with grammar pruning.

Figure 3:
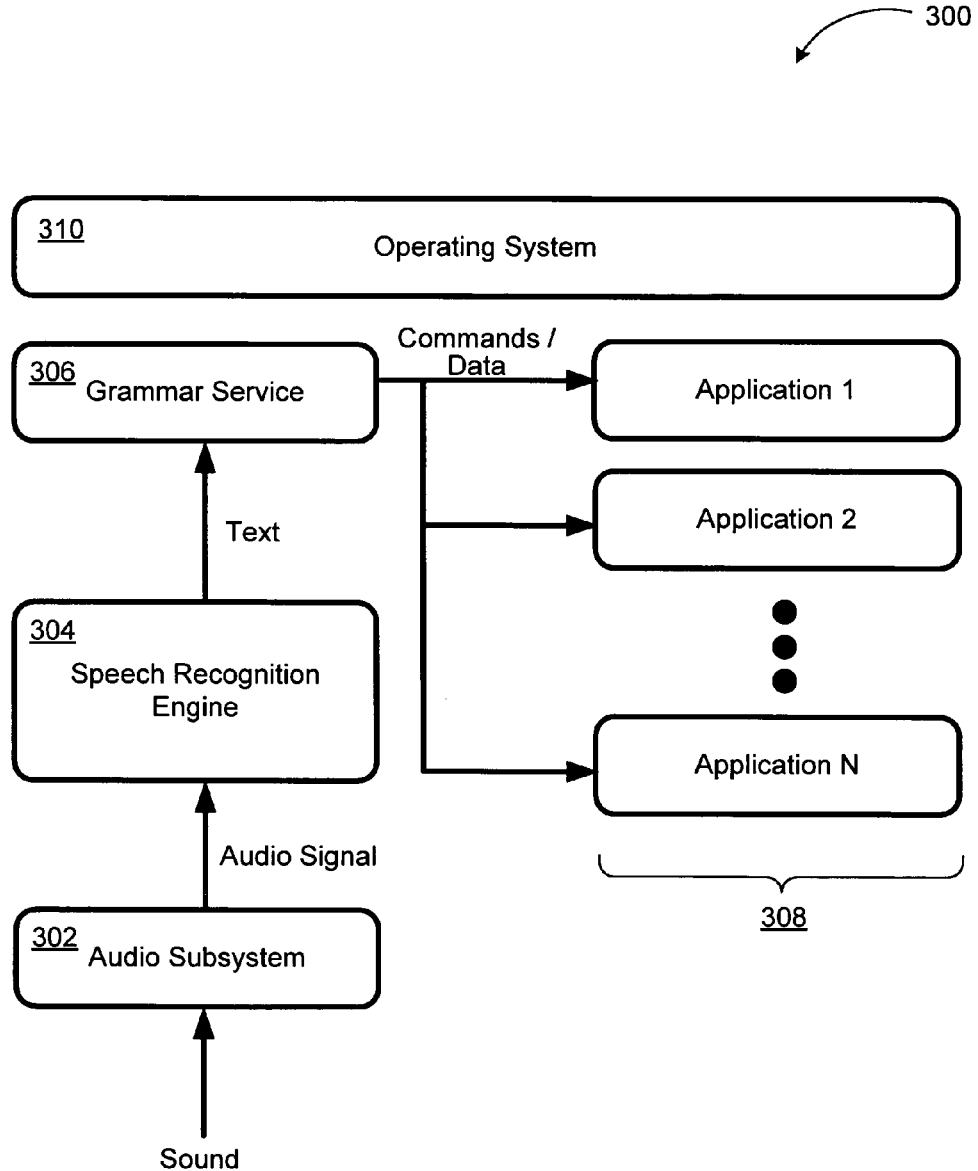
FIG. 3 illustrates an example architecture of a speech recognition system with grammar pruning according to embodiments.

FIG. 3 illustrates example architecture 300 of a speech recognition system with grammar pruning. Architecture 300 may comprise any topology of processing systems, storage systems, source systems, and configuration systems. Architecture 300 may also have a static or dynamic topology.

In supporting multiple speech-enabled applications to run simultaneously, an operating system may face a number of challenges such as "grammar overlap" or "grammar proximity." Grammar overlap is the likelihood of two or more programs designed to use the same recognition keyword for different actions receiving the same command, because each application's grammar may be designed separately. Grammar proximity refers to two programs using recognition keywords that sound alike, making speech recognition task more difficult and error-prone. Another issue that arises in a speech enabled multi-application environment is interface overloading. For example, a top level speech menu of a system may support six applications (A, B, C, D, E, F) with each application contributing 10 keywords to the top level menu. This would result in the top level menu of the speech recognition interface having to support 60 keywords (commands). As the number of applications (and features) increases and the combined grammar expands, the system may become less usable, because the application grammars may have an increasing tendency to compete with each other.

According to some embodiments, grammar contention (grammar overlap and proximity) as well as interface overload may be substantially reduced by enabling an application to define "importance" levels for its global grammar elements (commands). For example, more common commands may be given a higher "importance" level than others. This enables the speech recognition system to automatically prune the global grammar as applications get added to the system, while giving the applications the authority to declare which commands are most important to their users.

An operating system with multiple speech enabled applications may provide an example implementation scenario for some embodiments. The operating system may typically control a number of applications including a word processing application, a spreadsheet application, a media player application, and the like. Each application may insert several common commands into the top level menu of the speech recognition interface (e.g. "open document", "save", "open sheet", "enter formula", "play", "pause", "dial"), each with an "importance level" specified. These commands could be considered short cuts. Initially, only two of the applications may be present in the operating system. The operating system could decide to expose all grammar elements in the menu, regardless of their importance level, because the total number of commands is reasonably small. However, if the end user later installs or activates another two applications, the top-level menu could become too complex. At that point, the operating system may decide to prune certain grammar elements from the top level menu, so that only those with "high" importance remain. In addition, the operating system may track the frequency of use of each command, to ensure that a frequently used command remains in the top-level menu, even if the application specified its importance as "low."

Furthermore, a speech recognition system, according to embodiments, may also enable an application to specify an "importance" level for alternative grammar elements (e.g. synonyms for a particular command). This enables the system to prune synonyms from the combined global grammar, to avoid recognition conflicts. According to other embodiments, the "importance" levels may be used in combination with a current "priority" level of the active applications, so that a "foreground" application provides more commands than a "background" application. Below is an example of how a list of alternatives may be expressed in a mark-up language:

```
<command id="initiate phone call" importance="1">
    <one-of>
        <item importance="1"> call </item>
        <item importance="1"> dial </item>
        <item importance="2"> phone </item>
        <item importance="3"> contact </item>
        <item importance="3"> buzz </item>
    </one-of>
</command>.
```

Now referring to FIG. 3, audio subsystem 302 begins the process of speech recognition by converting sound input to audio signals. This block is typically implemented as signal processors that are well known in the art. The audio signal is provided to speech recognition engine 304, which converts the audio signal to textual data.

Speech engine 304 may comprise a number of components such as a language modeling module, a training module, a language model customization module, and the like. Speech recognition engine 304 recognizes words, phrases, and the like, based on customized language and acoustic models and provides textual versions of the audio utterances.

Grammar service 306, according to embodiments, performs the task of managing recognized text before it is provided to applications 1 through N (308). As shown in the figure, multiple applications may consume the recognized text. This may lead to one or more of the problems described above. To reduce grammar contention and interface overload, grammar service 306 may prune the grammar elements available at any given time using a registration and prioritization process.

The registration and prioritization process essentially assigns priorities or importance levels to elements (commands) associated with each application. Grammar service 306 acts as an arbiter of competing speech enabled applications using the same interface.

Applications 1 through N (308) represent any speech enabled application including, but not limited to, word processing applications, presentation applications, browsing applications, navigational assistance applications, media player applications, radio/TV tuner applications, communication applications, and the like. Operating system 310 provides a framework for the different components of the speech recognizing system to work within. While the illustration shows all components and the applications under one operating system, various portions of architecture 300 may be executed in different operating systems.

Components of the speech recognizing system such as grammar service 306 may be loaded into a server, executed over a distributed network, executed in a client device, and the like. Furthermore, the components described above are for illustration purposes only, and do not constitute a limitation on the embodiments. A speech recognizing system with automatic grammar pruning may be implemented using fewer or additional components in various orders. Individual components may be separate applications, or part of a single application. The speech recognition system or its components may include individually or collectively a user interface such as a web service, a Graphical User Interface (GUI), and the like.

Figure 4:
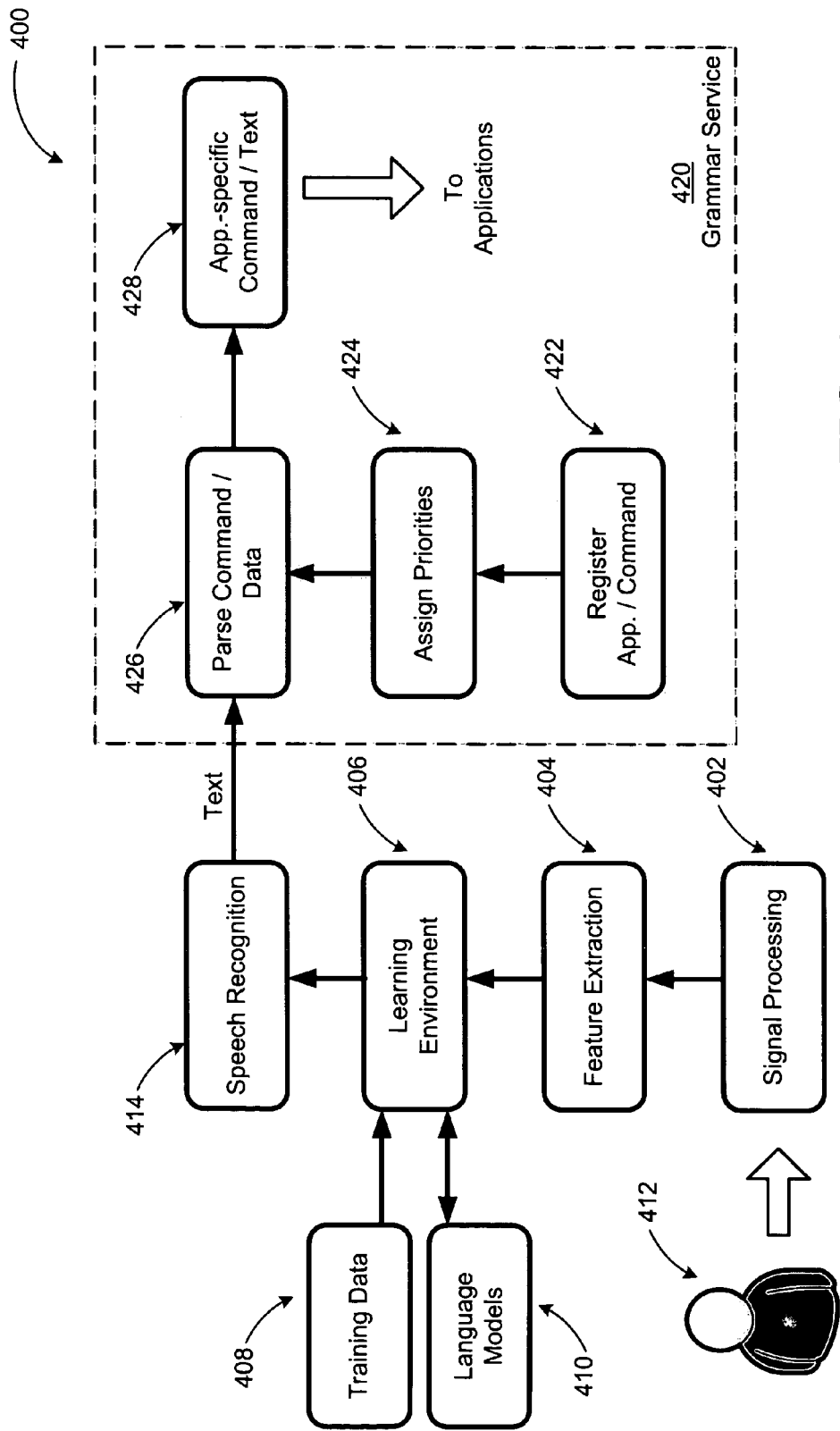
FIG. 4 illustrates a conceptual diagram of processes and sub-processes of an implementation of a speech recognition system with grammar pruning.

FIG. 4 illustrates a conceptual diagram of processes and sub-processes of an implementation of a speech recognition system with grammar pruning. Speech recognition systems rely on a number of statistical models to capture information about speech. Often, the language and/or acoustic models are adapted for a particular user allowing the system to capture the user's speaking style and vocabulary. Textual or audio data may be available (e.g. the user's archived e-mails, stored documents, and the like) to be used by the speech recognition application to learn about the words the user tends to use and the way they tend to use them.

On the speech recognition portion of operations, user 412 provides voice input to signal processing 402, which converts the sound signals to audio signals. Feature extraction process 404 determines recognizable portions of audio signals that can be converted to textual data. Learning environment 406 is a part of any speech recognition system where training data 408 and language models 410 are used to enhance conversion of audio signals to textual data. Language models may be updated based on feedback from learning environment 406 as well. Speech recognition 414 is the process, where textual data is produced for software applications. In some embodiments, speech recognition may include parsing of commands and data based on input from grammar service 420, which maintains and uses a global command list for multiple applications. In other embodiments, this functionality may be performed within grammar service 420.

As mentioned above, grammar service operations may begin with parsing of commands and data (426) from the recognized text. Prior to this step, however, grammar service 420 may go through a registration process 422 of applications and commands. The registration of commands may include a selection process, where the grammar service allows a predetermined number of commands among all commands submitted by the registered applications to maintain a maximum size for its global command list. The registration process may be followed by an assignment of priorities process 424, where each command is assigned a priority or importance level based on a status or type of the associated application, a suggested priority level by the application, a number of already registered applications and/or commands, available system resources, a category of commands, and the like. The priority levels may even be assigned or modified externally based on credentials of a user, system administrator, or an application. The prioritized global command list is then used in parsing the commands from the recognized text. The grammar service may then provide the parsed application-specific commands to individual applications in process 428.

In some embodiments, grammar service 420 may register synonyms for registered commands. Depending on a number of active applications and available system resources, the number of registered synonyms may also be pruned by the grammar service.

Optionally, the grammar service may build a secondary "subgrammar" to provide access to the commands that have been pruned from the unified grammar. To accomplish this, a unique identifier may be determined for each application and saved along with an importance level of the application and a grammar command that identifies that application. The grammar service may then include the application's grammar command in its unified grammar, such that this grammar command can access a "submenu" (also built by the grammar service) that contains the full list of functions. For example, consider an application called "media player" that implements a number of functions such as "play", "stop", "pause", "next", "previous", and so on. Initially, the grammar service may attempt to place all of the commands in the unified grammar. If the grammar service is forced to prune commands, it may create an additional command called "media player" which provides access to a submenu of all the pruned commands associated with the "media player" application.

Figure 5:
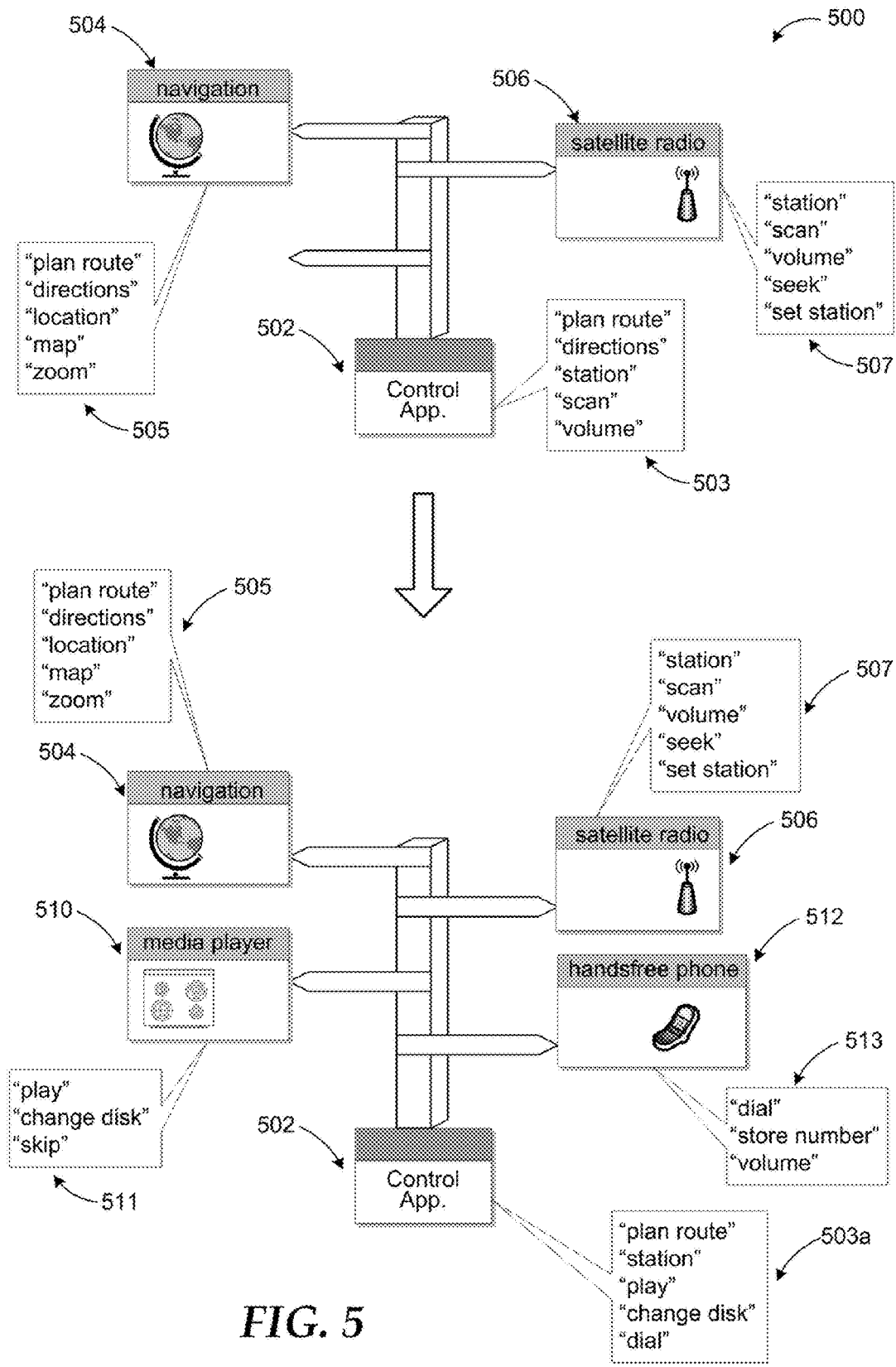
FIG. 5 illustrates two example stages of speech recognition based control in a multi-application environment.

FIG. 5 illustrates two example stages of speech recognition based control in a multi-application environment. The multi-application environment is an example in-car-control system that manages various applications in an automobile.

In the first phase of diagram 500, control application 502 is arranged to provide a speech recognition interface and control two applications, navigation assistance application 504 and satellite radio tuner application 506. Each application provides a list of five commands to be registered and used by the control application. For example, navigation assistance application 504 may provide commands "plan route", "directions", "location", "map", and "zoom" as designated by reference numeral 505. Satellite radio tuner application 506 may provide the commands "station", "scan", "volume", "seek", and "set station" as designated by reference numeral 507. Based on the lists of global commands provided by both applications, control application 502 selects and prioritizes five commands for the common interface. The commands, designated by reference numeral 503, are "plan route", "directions", "station", "scan", and "volume."

In the second phase, two additional applications are activated: media player application 510 and hands-free-phone application 512. As described previously, the new applications submit their global commands as well. According to some embodiments, not each application has to submit an equal number of commands. As shown in the example diagram, the additional applications submit three commands each. For example, media player application 510 submits commands "play", "change disk", and "skip" as designated by reference numeral 511. Hands-free-phone application 512 submits the commands "dial", "store number", and "volume" as designated by reference numeral 513. Control application 502 reassesses the list of commands, selects a new set of commands to be included in a revised list of five top level commands 503a, and assigns priorities to the new list of commands. The top priority command "plan route" remains in first place. The previously second command "directions" is dropped from the list. In its place, the satellite radio command "station" is moved to second place. Third command is "play" from media player application 510. Fourth command "change disk" is also from media player application 510. Finally, the fifth command "dial" is from hands-free-phone application 512.

The speech recognition and grammar pruning processes, components, examples, and architecture discussed in FIGS. 3 through 5 are for illustration purposes only. Embodiments are not limited to the example applications, modules, or processes. Managing speech recognition in a multi-application environment may be provided in many other ways using the principles described herein.

Figure 6:
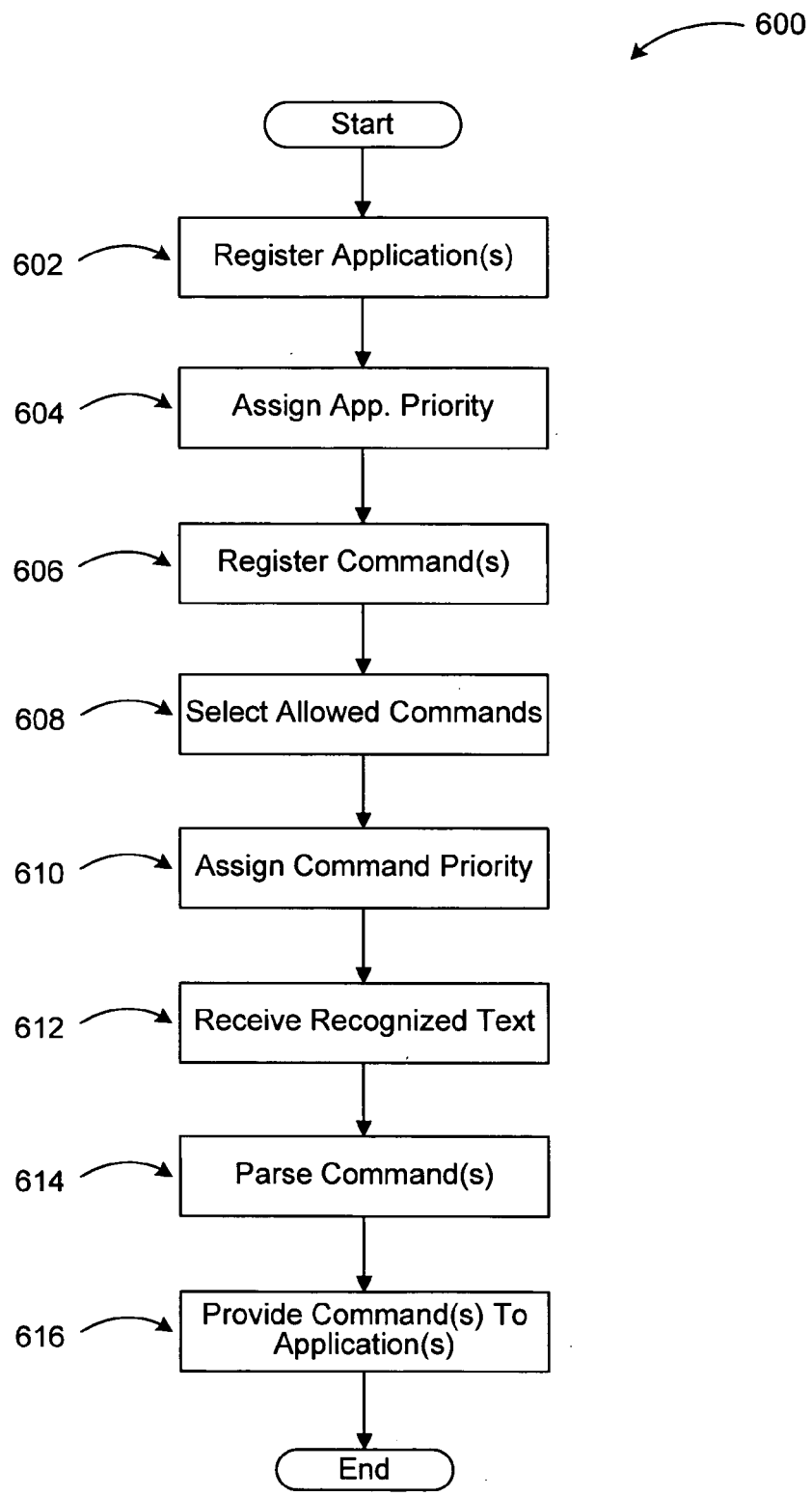
FIG. 6 illustrates a logic flow diagram for a process of using grammar pruning in a speech recognition system.

FIG. 6 illustrates a logic flow diagram for a process of using grammar pruning in a speech recognition system. Process 600 may be implemented in a component of a speech recognition system such as the grammar service 306 of FIG. 3.

Process 600 begins with operation 602, where the grammar service receives request(s) for registration from one or more applications and registers the application(s) acting as an arbiter of competing speech interfaces. The grammar service essentially gives the applications the authority to declare which commands are most important to their users by defining importance levels for their global grammar elements (commands). Processing advances from operation 602 to operation 604.

At operation 604, priorities or importance levels are assigned to registered applications. The priority levels may be assigned based on a type or status of an application. For example, communication applications may be assigned higher priority levels than entertainment applications. The priority levels may also be assigned so that a "foreground" application provides more commands than a "background" application. The assigned application priority levels may then be used in selecting and prioritizing commands from each application for the global command list. Processing proceeds from operation 604 to operation 606.

At operation 606, the grammar service receives a list of commands to be registered from each registered application. This step is basically a brokering operation, where the grammar service begins to determine which commands should be allowed and in what order in the global command list. The registered applications may provide suggested priority levels for their submitted commands. Processing moves from operation 606 to operation 608.

At operation 608, the grammar service selects allowed commands for the global command list. The grammar service may use a heuristic to determine a maximum allowable size of the global command list, also referred to as unified grammar. The size can be a constant maximum value chosen at implementation or a heuristic chosen by the grammar service at run-time based on an analysis of the available computing resources, application status, and the like. If the unified list is larger than the allowed maximum size, the grammar service may start removing grammar elements beginning with those set at the lowest importance level.

In selecting allowed commands, the grammar service may prune "conflicts" from the unified grammar. A "conflict" is defined as two grammar elements (commands) that are identical, or that are grammatically similar enough to create problems with speech recognition. The grammar service may perform an item-by-item comparison of all grammar elements, comparing every grammar element to every other, using a comparison method based on a metric of "grammatical distance" or the number of distinctive phonetic characteristics that can be used to differentiate the two grammar components. If a conflict is found, the grammar service may use the importance level assigned to each grammar element to eliminate those with lower importance. The grammar service may also use the priority assigned to each software application to resolve conflicts between grammar elements from different applications that are set to the same importance level.

Additionally, the grammar service may use application status to select grammar elements to be included in the global command list. For example, if certain functionalities are not available for an active application, such as phone service being not available despite the hands-free-phone application being active, the grammar service may lower the priorities or remove the commands associated with that application from the global command list. Processing advances from operation 608 to operation 610.

At operation 610, the grammar service assigns priority levels to the selected commands. As mentioned above, the priorities or importance levels may be assigned based on a status or a type of the associated application, a suggested priority level by the application, a number of already registered applications and/or commands, available system resources, a category of commands, and the like. The priority levels may also be assigned or modified externally based on credentials. For example, a system administrator or a user may assign or modify the priorities depending on their permission levels (a user may be allowed to modify priority levels for entertainment or office applications, but not system or communication applications). Furthermore, certain applications may also be given the authority to force a change in the importance levels of their commands based on predetermined permission levels. Processing moves from operation 610 to operation 612.

At operation 612, recognized text is received from a speech recognition engine. The recognized text may include raw data and commands. In some embodiments, the speech recognition engine may perform parsing functions and provide only the commands to the grammar service. In other embodiments, the grammar service may parse the commands as shown in operation 614. While parsing the commands, the grammar service may use the prioritized global grammar list and/or any submenus if they exist. Processing moves from operation 614 to operation 616.

At operation 616, the commands are provided to relevant applications for execution. As described previously, the global command list may be updated dynamically based on a number of active applications, application status, system resources status, and the like. After operation 616, processing moves to a calling process for further actions.

The operations included in process 600 are for illustration purposes. Managing multiple voice controlled applications by using grammar pruning may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part by a processor in a computing device for managing multiple speech enabled applications, comprising:

receiving a request for registering an application;
registering the application;

receiving a request from the registered application to register a set of grammar elements;

selecting a subset of the received set of grammar elements for registration;

assigning priority levels to the selected grammar elements based on a priority level of an associated registered application, a status of the associated registered application, a type of the associated registered application, a suggested priority level by the associated registered application, a number of preexisting registered applications, a number of preexisting registered commands, and a category of each grammar element;

adding the selected grammar elements to a global list; and performing speech recognition operations associated with the application using the global list.

2. The method of claim 1, further comprising: selecting the subset of the received set of grammar elements such that a number of grammar elements from all registered applications is less than a maximum number for the global list.

3. The method of claim 2, wherein the maximum number for the global list is determined based on one of a predetermined constant value and a heuristic chosen at run-time based on an analysis of available system resources.

4. The method of claim 2, further comprising: removing registered grammar elements from the global list when the maximum number is exceeded based on the assigned priority levels to the grammar elements.

5. The method of claim 1, further comprising: receiving a set of suggested priority levels associated with the received set of grammar elements from the registered application.

6. The method of claim 1, further comprising: selecting the subset of the received set of grammar elements such that a grammar conflict between the grammar elements is prevented.

7. The method of claim 6, further comprising: preventing the grammar conflict by employing a comparison of commands based on one of a metric of grammatical distance and a number of distinctive phonetic characteristics.

8. The method of claim 7, further comprising: assigning a priority level to the registered application based on whether the application is one of a foreground application and a background application.

9. The method of claim 7, further comprising: assigning a priority level to the registered application based on a type of the application.

10. The method of claim 1, wherein the status of the associated application includes at least one from a set of: the application being a foreground application, the application being a background application, the application being active, and a system resource associated with the application being available.

11. The method of claim 1, further comprising: assigning the priority levels to the selected grammar elements based on an input from one of: a system administrator, a user, and an application with a sufficient permission level.

12. The method of claim 1, further comprising: dynamically updating the global list based on at least one of: a change in a status of registered applications and a predetermined period.

13. The method of claim 1, further comprising: tracking a frequency of use for each of the selected grammar elements to update their priority level.

14. A non-transitory computer-readable storage medium storing computer executable instructions, which are executed by a processor, for providing a single speech recognition interface in a multi-application environment, the instructions comprising:

in response to a request from each application, registering a plurality of applications by assigning a priority level based on a status and a type of each application;

receiving a request from a registered application to register a set of grammar elements;

selecting a subset of the received set of grammar elements for registration such that a maximum size for a unified grammar is preserved and a conflict between the grammar elements is prevented;

assigning a priority level to each selected grammar element based on a priority level of an associated application, a status of the associated application, a type of the associated application, a suggested priority level by the associated application, a number of already registered applications, a number of already registered grammar elements, a status of available system resources, and a category of each grammar element; and adding the selected grammar elements to the unified grammar.

15. The computer-readable storage medium of claim 14, wherein the instructions further comprise:

registering at least one synonym for each registered grammar element; and removing registered grammar elements and their synonyms based on at least one from a set of: a priority level associated with the grammar element, a priority level of an associated application, a status of the associated application, a type of the associated application, a suggested priority level by the associated application, a number of already registered applications, a number of already registered grammar elements, a status of available system resources, and a category of each grammar element.

16. The computer-readable storage medium of claim 14, wherein the instructions further comprise: in response to the maximum size for the unified grammar being exceeded, registering a new grammar element; moving a set of grammar elements associated with an application to a submenu such that the grammar elements in the submenu are accessible through the new grammar element; and removing the grammar elements in the submenu from the unified grammar.

17. A system for managing multiple speech enabled applications, comprising:

at least one computing device including a speech recognition service executing thereon, the speech recognition service configured to convert audio signals to textual data;

at least one other computing device including a grammar service executing thereon, the grammar service configured to:

in response to a request from an application, register the application by assigning a priority level based on a status and a type of each application;

receive a request from the registered application to register a set of commands;

select a subset of the received set of commands for registration such that a maximum size for a global command list is preserved and a conflict between the commands is prevented;

assign a priority level to each selected command based on a priority level of the application, a status of the application, a type of the application, a suggested priority level for the command by the application, a number of already registered applications, a number of already registered commands, a status of available system resources, and a category of each command;

add the selected commands to the global command list; and parse commands for the speech enabled applications from the textual data employing the command list.

18. The system of claim 17, wherein the speech recognition service is further configured to parse the commands based on a feedback from the grammar module.

19. The system of claim 17, wherein the grammar service is further configured to remove registered commands from the global command list, if the maximum size is exceeded based on the assigned priority levels to the commands.

* * * * *